US012776965B1

(12) United States Patent
Arora et al.

(10) Patent No.: US 12,776,965 B1
(45) Date of Patent: Oct. 27, 2026

(54) SYSTEMS AND METHODS FOR THE MONITORING AND AUTOMATIC MAINTENANCE OF SERVICE IDS

(71) Applicant: BANK OF AMERICA CORPORATION, Charlotte, NC (US)

(72) Inventors: Saurabh Arora, Gurugram (IN); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/191,292

(22) Filed: Apr. 28, 2025

(51) Int. Cl.
*H04L 41/5009* (2022.01)
*H04L 9/00* (2022.01)
*H04L 9/40* (2022.01)
*H04L 43/026* (2022.01)
*H04L 43/0817* (2022.01)

(52) U.S. Cl.
CPC ........ *H04L 41/5012* (2013.01); *H04L 43/026* (2013.01); *H04L 43/0817* (2013.01); *H04L 9/008* (2013.01); *H04L 63/108* (2013.01)

(58) Field of Classification Search
CPC ............... H04L 41/5012; H04L 43/026; H04L 43/0817; H04L 63/102; H04L 63/108
See application file for complete search history.

(56) References Cited

U.S. PATENT DOCUMENTS

| | | | | |
|---|---|---|---|---|
| 6,769,068 | B1 * | 7/2004 | Brozowski | H04L 63/08 726/1 |
| 7,925,554 | B1 * | 4/2011 | Sirota | G06Q 20/102 705/40 |
| 8,132,242 | B1 * | 3/2012 | Wu | H04L 63/0884 713/168 |
| 8,305,911 | B2 * | 11/2012 | Diwakar | G06F 11/3409 370/242 |
| 9,648,011 | B1 * | 5/2017 | Mattsson | H04L 9/3226 |
| 12,541,585 | B2 * | 2/2026 | Dande | G06F 21/45 |

(Continued)

FOREIGN PATENT DOCUMENTS

CA 3060421 A1 * 10/2018 ........... H04L 63/108

*Primary Examiner* — James R Sheleheda
(74) *Attorney, Agent, or Firm* — Moore & Van Allen PLLC; Nicholas C. Russell

(57) ABSTRACT

Systems, computer program products, and methods are described herein for the monitoring and automatic maintenance of service IDs. The present disclosure is configured to identify a service ID associated with an application within a network of an entity, wherein the service ID is required for the application to access one or more network components of the network; monitor the service ID and identify disruptions, wherein a disruption prevents use of the service ID to access one or more of the network components; match an identified disruption with a corresponding update in predefined rules; implement the corresponding update for the identified disruption based on the predefined rules; validate the corresponding update, wherein validating the corresponding update comprises confirming the corresponding update causes the service ID to function within the network; and transmit the corresponding update to instances of the service ID occurring within the network upon validating the corresponding update.

20 Claims, 7 Drawing Sheets

(56) References Cited

U.S. PATENT DOCUMENTS

| | | | | |
|---|---|---|---|---|
| 2004/0128551 | A1* | 7/2004 | Walker | G06F 21/6218 726/19 |
| 2006/0041756 | A1* | 2/2006 | Ashok | G06F 21/31 726/26 |
| 2007/0150737 | A1* | 6/2007 | Parupudi | H04L 9/3263 713/175 |
| 2008/0172341 | A1* | 7/2008 | Crandell | G06F 21/31 713/168 |
| 2009/0077242 | A1* | 3/2009 | Lin | H04L 65/1063 709/227 |
| 2010/0067035 | A1* | 3/2010 | Kawakubo | G06F 3/1224 358/1.13 |
| 2011/0179476 | A1* | 7/2011 | Euler | G06F 21/445 726/6 |
| 2013/0007856 | A1* | 1/2013 | Bennett | G06F 21/33 726/6 |
| 2014/0122695 | A1* | 5/2014 | Kulikov | H04L 41/5054 709/224 |
| 2014/0207929 | A1* | 7/2014 | Hoshino | H04L 12/4641 709/223 |
| 2014/0289417 | A1* | 9/2014 | Chan | H04L 47/70 709/226 |
| 2015/0100495 | A1* | 4/2015 | Salama | G06Q 20/405 705/65 |
| 2016/0142218 | A1* | 5/2016 | Kim | H04L 12/1475 370/259 |
| 2017/0093857 | A1* | 3/2017 | Hinohara | G06F 21/335 |
| 2019/0179692 | A1* | 6/2019 | Udayaadithya | G06F 11/3476 |
| 2020/0127994 | A1* | 4/2020 | Kukreja | G06F 21/31 |
| 2020/0374225 | A1* | 11/2020 | Momchilov | H04L 45/42 |
| 2021/0075782 | A1* | 3/2021 | Dunjic | G06F 9/4451 |
| 2022/0014512 | A1* | 1/2022 | Raleigh | H04L 63/0823 |
| 2023/0069857 | A1* | 3/2023 | D'souza | H04L 9/3066 |
| 2023/0269136 | A1* | 8/2023 | Gupta | H04W 76/10 370/254 |
| 2024/0152599 | A1* | 5/2024 | Amit | H04L 9/0863 |
| 2025/0030690 | A1* | 1/2025 | Jolfaei | H04L 63/101 |
| 2025/0141734 | A1* | 5/2025 | Mysore | H04L 41/069 |
| 2025/0355992 | A1* | 11/2025 | Dande | G06F 21/45 |
| 2026/0057063 | A1* | 2/2026 | Saball | G06F 21/45 |
| 2026/0106869 | A1* | 4/2026 | Immidisetty | H04L 63/0876 |

* cited by examiner

SYSTEMS AND METHODS FOR THE MONITORING AND AUTOMATIC MAINTENANCE OF SERVICE IDS

TECHNOLOGICAL FIELD

Example embodiments of the present disclosure relate to the monitoring and automatic maintenance of service IDs. Specifically, the present disclosure provides for periodically monitoring service IDs against predefined rules and implementing updates to maintain the service IDs.

BACKGROUND

In today's electronic environment, it is increasingly difficult for entities to manage all service IDs within their network. The sheer number of service IDs within a network may make it difficult to handle the various problems that may occur with the service IDs. If a problem with a service ID is not solved in a timely manner, applications within the network may not be able to properly function. As such, it is important for entities to effectively monitor the service IDs that would impact their networks. Therefore, a need exists to develop systems, computerized methods, computer program products and the like that provide for managing service IDs in an effective and automated manner.

Applicant has identified a number of deficiencies and problems associated with monitoring and automatic maintenance of service IDs. Through applied effort, ingenuity, and innovation, many of these identified problems have been solved by developing solutions that are included in embodiments of the present disclosure, many examples of which are described in detail herein

BRIEF SUMMARY

The following is a simplified summary of one or more embodiments of the disclosure in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present disclosure provide for systems, methods, computer program products and the like for the monitoring and automatic maintenance of service IDs.

A system for monitoring and automatic maintenance of service IDs defines first embodiments of the disclosure. The system comprises at least one memory device comprising non-transitory computer-readable medium with computer-readable program code stored thereon and at least one processing device operatively couples to the at least one memory device and at least one communication device. When executed, the computer-readable code is configured to cause the at least one processing device to: identify a service ID associated with an application within a network of an entity, wherein the service ID is required for the application to access one or more network components of the network; monitor the service ID and identify disruptions associated with the service ID, wherein a disruption prevents use of the service ID to access one or more of the network components; match an identified disruption with a corresponding update in predefined rules; implement the corresponding update for the identified disruption based on the predefined rules; validate the corresponding update, wherein validating the corresponding update comprises confirming that the corresponding update causes the service ID to function within the network; and transmit the corresponding update to instances of the service ID occurring within the network upon validating the corresponding update.

In some embodiments of the disclosure, monitoring the service ID and identifying the disruptions associated with the service ID comprises mapping the service ID to each of the one or more network components the service ID is used to access. In some embodiments, monitoring the service ID and identifying the disruptions associated with the service ID comprises analyzing data associated with the service ID.

In some embodiments of the disclosure, validating the corresponding update comprises: monitoring the service ID after implementing the corresponding update for a period of time; verifying that there are no additional disruptions associated with the service ID during the period of time; and confirming, upon verification that there are no additional disruptions associated with the service ID, that the corresponding update causes the service ID to function within the network.

In some embodiments of the disclosure, the predefined rules comprise a list of potential disruptions, updates for each of the potential disruptions, and instructions for implementing the updates for each of the potential disruptions. In some embodiments, the list of potential disruptions comprises at least one of: expiration of the service ID, inactivity of the service ID, transfer of ownership of the service ID, or lack of entitlements associated with the service ID.

In some embodiments of the disclosure, the computer-readable code is further configured to cause the at least one processing device to receive the predefined rules from a user or from the one or more network components of the network.

In some embodiments of the disclosure, the computer-readable code is further configured to cause the at least one processing device to notify an owner of the service ID if the system fails to validate the corresponding update or upon transmitting the corresponding update to the instances of the service ID occurring in the network.

Similarly, and as a person of skill in the art will understand, each of the features, functions, and advantages provided herein with respect to the system disclosed herein above may additionally be provided with respect to a computer implemented method and computer program product. Such embodiments are provided for exemplary purposes below and are not intended to be limited.

The above summary is provided merely for purposes of summarizing some example embodiments to provide a basic understanding of some aspects of the present disclosure. The features, functions, and advantages that have been discussed may be achieved independently in various embodiments of the present disclosure or may be combined with other embodiments, further details of which can be seen with reference to the following description and drawings. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany-ing drawings. The components illustrated in the figures may or may not be present in certain embodiments described herein. Some embodiments may include fewer (or more) components than those shown in the figures.

Figure 1A:
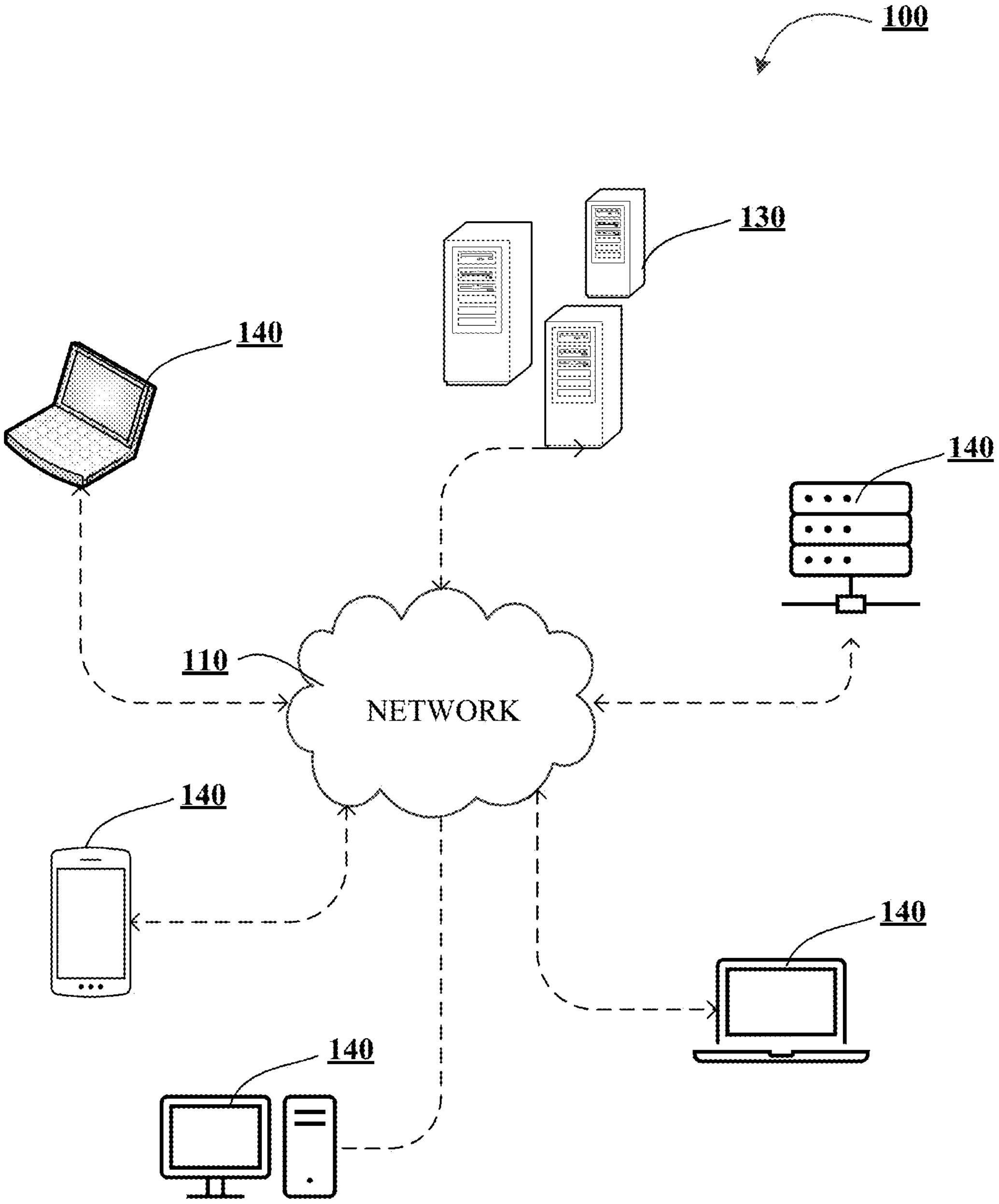
Figure 1B:
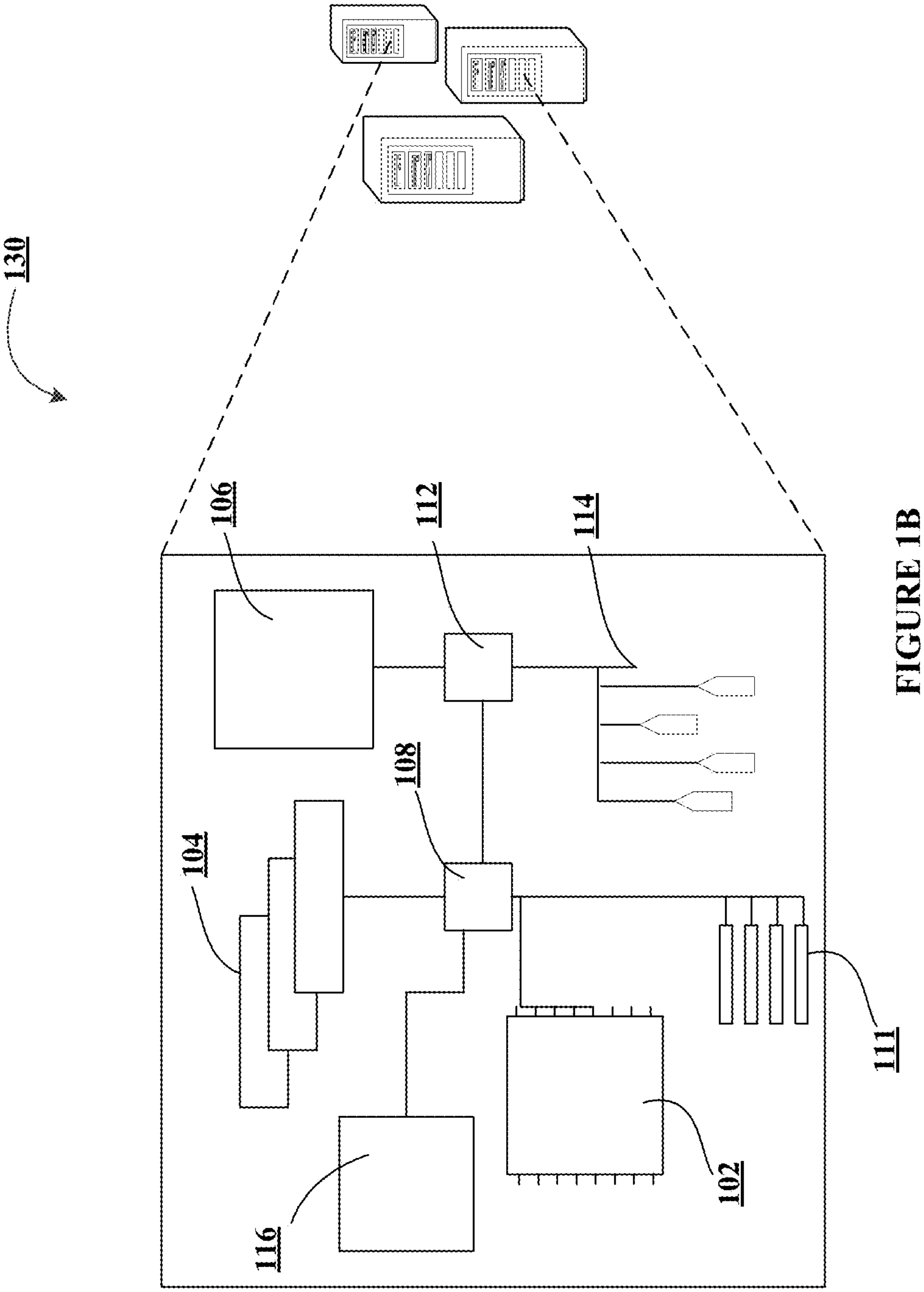
Figure 1C:
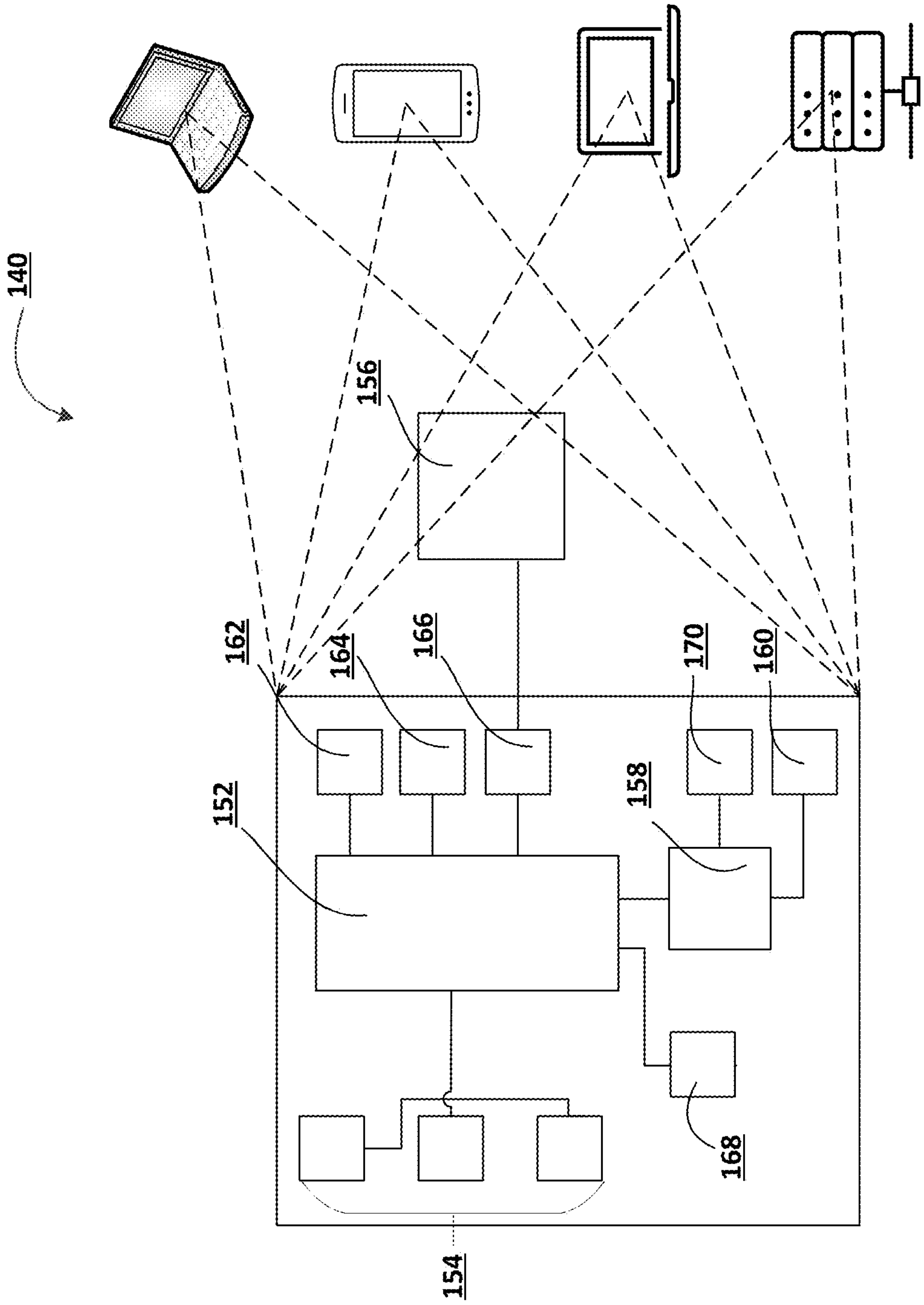

FIGS. 1A-1C illustrate technical components of an exemplary distributed computing environment for monitoring and automatic maintenance of service IDs, in accordance with an embodiment of the disclosure.

Figure 2:
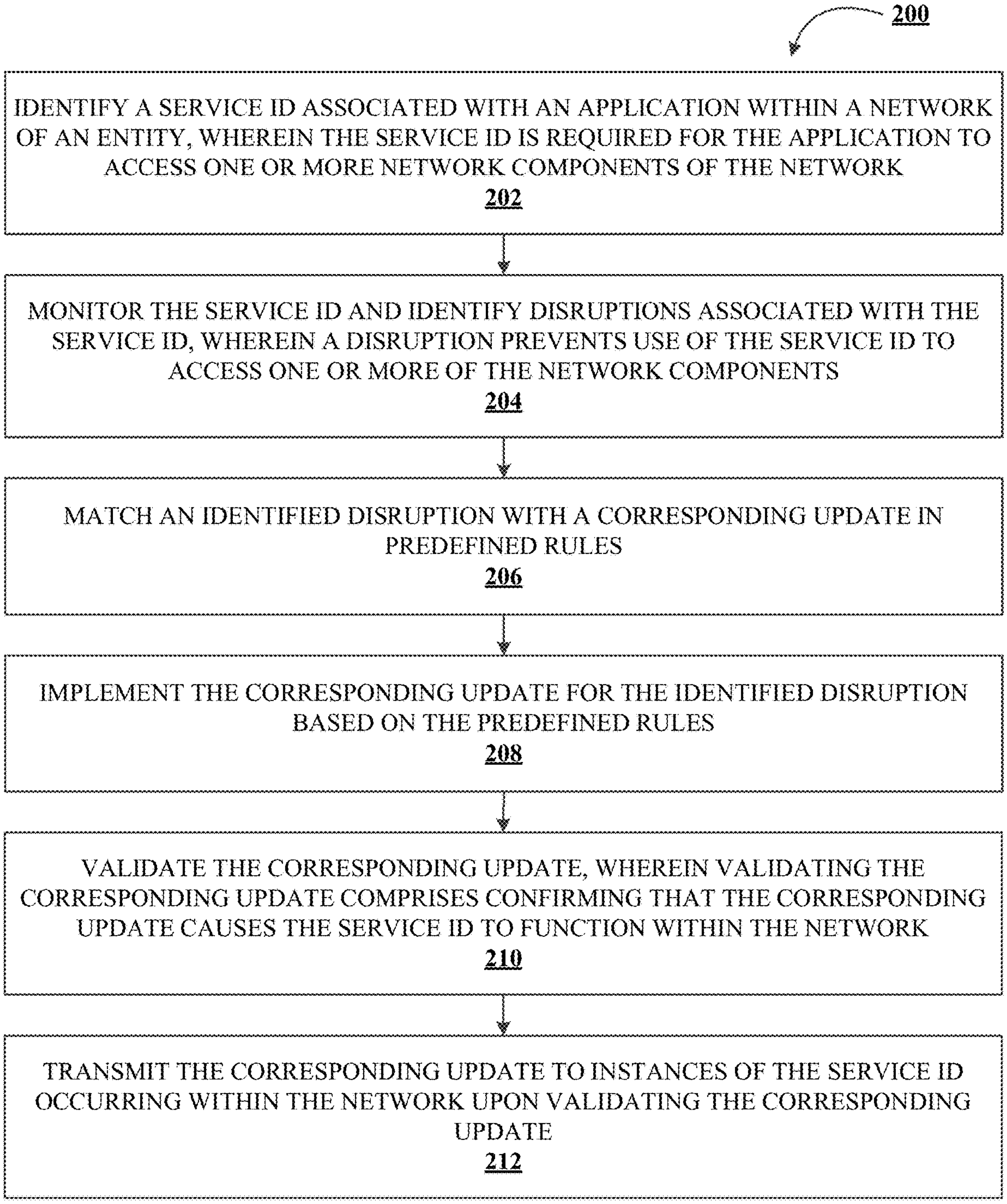

FIG. 2 illustrates a process flow for monitoring and automatic maintenance of service IDs, in accordance with an embodiment of the disclosure.

Figure 3:
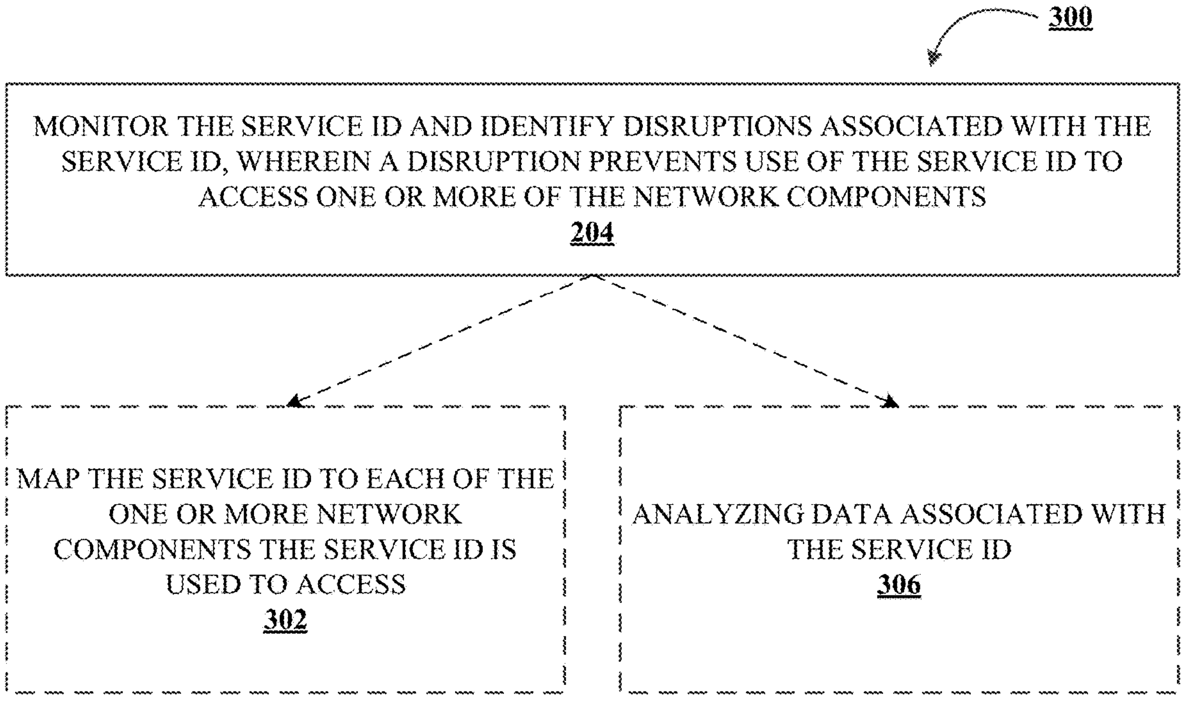

FIG. 3 illustrates a diagram for monitoring the service ID and identifying disruptions associated with the service ID, in accordance with an embodiment of the disclosure.

Figure 4:
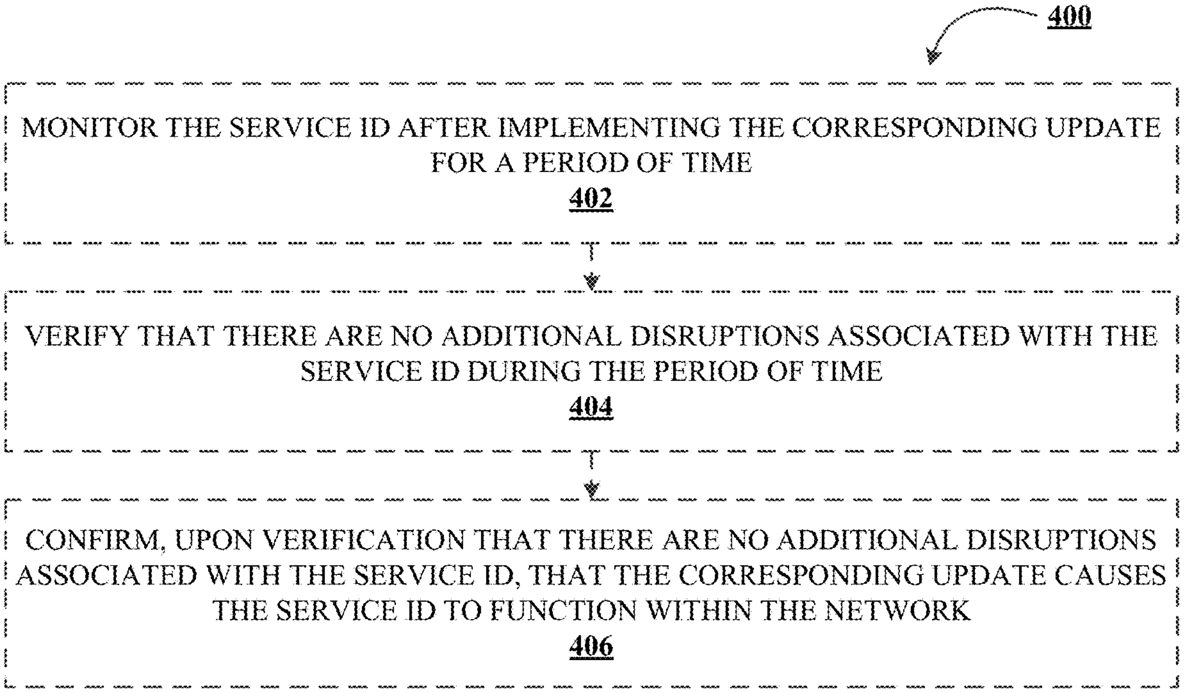

FIG. 4 illustrates a process flow for validating the corresponding update, in accordance with an embodiment of the disclosure.

Figure 5:
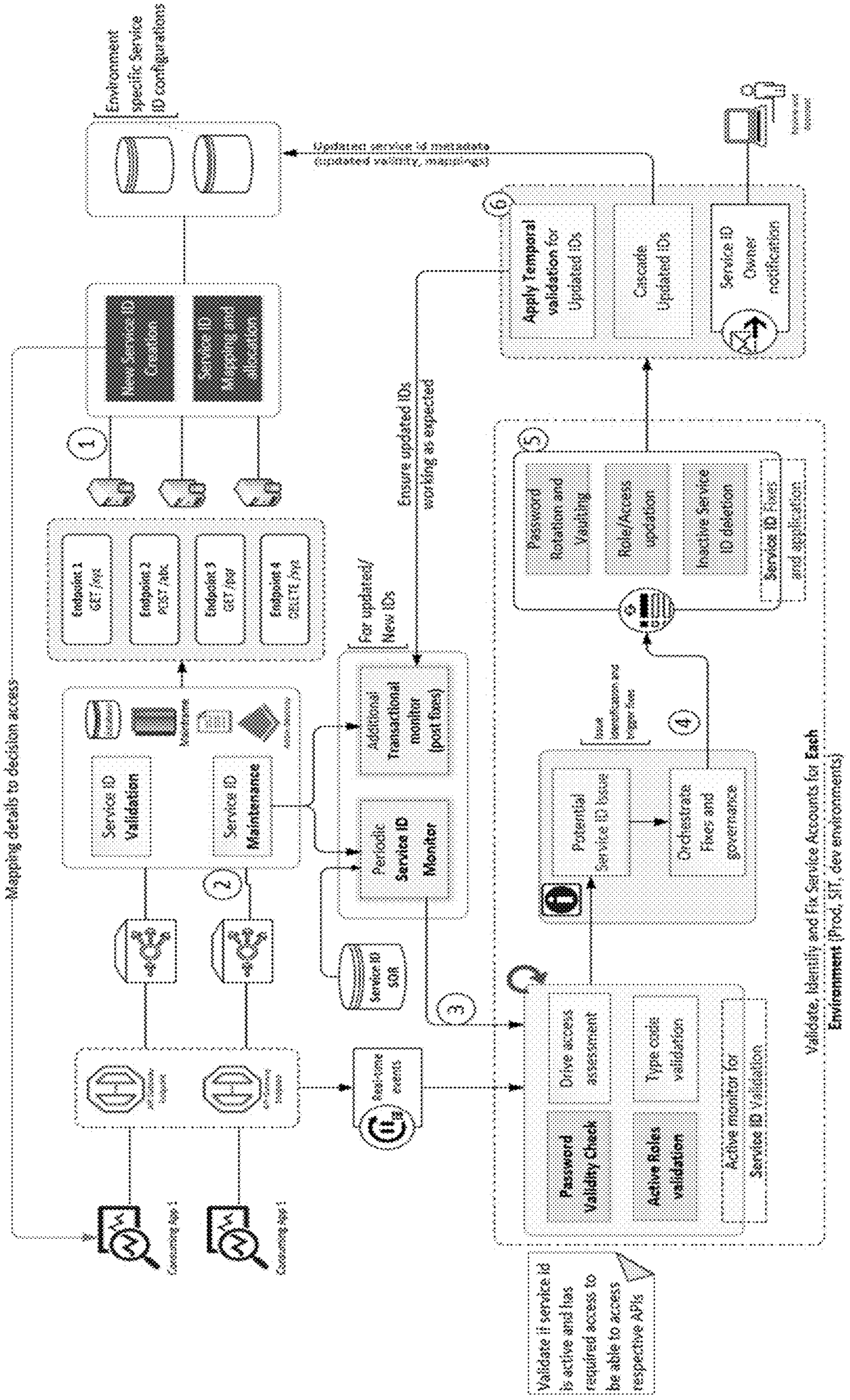

FIG. 5 illustrates a process flow for monitoring service IDs, identifying disruptions and implementing updates, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships, or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface may include a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that may be used to identify a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (e.g., distal phalanges, intermediate phalanges, proximal phalanges, and the like)), an answer to a security question, a unique intrinsic user activity (e.g., making a predefined motion with a user device), and/or the like. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources input by the plurality of users within the system. The system may further use its authentication servers to certify the identity of users of the system, such that other users may verify the identity of the certified users. In some embodiments, the entity may certify the identity of the other users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (e.g., rotationally coupled, pivotally coupled, or the like). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

According to embodiments of the disclosure, which will be described in more detail below, systems, methods and computer program products are disclosed that provide for the monitoring and automatic maintenance of service IDs. Specifically, service IDs can be maintained by monitoring the status of the service IDs periodically, identifying potential issues with the service IDs, finding solutions for the issue, testing the solutions, and implementing the solutions throughout the network.

Service IDs are essentially identification credentials that various systems, applications, servers, and the like may use to access or communicate with other systems, applications, servers or the like. Within a network of systems, applications, servers, and the like (each, a network component), each network component may have its own service ID that allows the network component to access or interact with another network component. Service IDs may, therefore, be analogous to user IDs that users use to access different applications or accounts. Like user IDs, service IDs may expire, may be on a password rotation such that the credentials need to be changed after a period of time, or may become inactive due to lack of use. Additionally, service IDs may be unable to be used if there's a transfer of ownership of the service ID or if use of the service ID loses permission to access a certain network component. In the current environment, each of these issues needs to be handled manually. With the number of service IDs that may exist within a network, each with its own set of permissions and qualities, managing all service IDs is not only a cumbersome task, but also a task that will inevitably lead to mistakes or missed issues. If a service ID is not maintained, certain network components may not be able to function the way they need to and, especially where network components are largely intertwined, the entire network may encounter problems. Therefore, it is incredibly important for service IDs to be managed and maintained in a timely and effective manner.

The present disclosure, therefore, provides for a system that automatically monitors service IDs within a network, consistently checking for all potential issues that may arise with the service IDs, and implementing fixes for any issues that arise to ensure that service IDs remain continuously active and functional. Checking for all potential issues may include making sure that the owner of the service ID remains the same, that the service ID is in use, that neither the service ID nor any associated passwords are about to expire. The fix to each type of problem may be predetermined and received from a user or from the entity. The fix may be tested by being implemented for a short period of time before it is fully implemented throughout the network. The owner of the service IDs may be notified if the fix fails the test or if the fix is successfully implemented.

Accordingly, the present disclosure provides for identifying a service ID associated with an application within a network of an entity. The service ID is required for the application to access one or more network components of the network. The disclosure further provides for monitoring the service ID and identifying disruptions associated with the service ID, where a disruption prevents use of the service ID to access one or more of the network components. In some embodiments of the disclosure, monitoring the service ID and identifying the disruptions associated with the service ID comprises mapping the service ID to each of the one or more network components the service ID is used to access. In some embodiments, monitoring the service ID and identifying the disruptions associated with the service ID comprises analyzing data associated with the service ID.

The disclosure further provides for matching an identified disruption with a corresponding update in predefined rules. In some embodiments, the disclosure further provides for receiving predefined rules from a user or from the one or more network components of the network. In some embodiments, the predefined rules comprise a list of potential disruptions, updates for each of the potential disruptions, and instructions for implementing the updates for each of the potential disruptions. In some embodiments, the list of potential disruptions comprises at least one of expiration of the service ID, inactivity of the service ID, transfer of ownership of the service ID, or lack of entitlements associated with the service ID. The disclosure further provides for implementing the corresponding update for the identified disruption based on the predefined rules and validating the corresponding update. Validating the corresponding update comprises confirming that the corresponding update causes the service ID to function within the network. In some embodiments, validating the corresponding update comprises monitoring the service ID after implementing the corresponding update for a period of time; verifying that there are no additional disruptions associated with the service ID during the period of time; and confirming that the corresponding update causes the service ID to function within the network.

The disclosure further provides for transmitting the corresponding update to instances of the service ID occurring within the network upon validating the corresponding update. In some embodiments of the disclosure, the disclosure further provides for notifying an owner of the service ID if the system fails to validate the corresponding update or upon transmitting the corresponding update to the instances of the service ID occurring in the network.

What is more, the present disclosure provides a technical solution to a technical problem. As described herein, the technical problem includes the difficulty of effectively maintaining service IDs within a network. The technical solution presented herein allows for the automatic maintenance of service IDs through consistent monitoring for issues and implementing predetermined solutions for identified issues. In particular, monitoring and automatically maintaining and updating service IDs is an improvement over existing solutions to the manual maintenance of service IDs, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for the monitoring and automatic maintenance of service IDs 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connected to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which may be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low-speed bus 114 and storage device 106. Each of the components 102, 104, 106, 108, 112 and 114 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface/controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, the low-speed interface/controller 112 is coupled to storage device 106 and low-speed bus/expansion port 114. The low-speed bus/expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 166 may comprise appropriate circuitry and may be configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier may be a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through the communication interface 158, which may include digital signal processing circuitry where necessary. The communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, a GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using an audio codec 162, which may receive spoken information from a user and convert the spoken information to usable digital information. The audio codec 162 may likewise generate audible sound for a user, such as through a speaker (e.g., in a handset of end-point device(s) 140). Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described herein may be realized in digital electronic circuitry, integrated circuitry, specially designed ASICs (application specific integrated circuits), computer hardware, firmware, software, and/or combinations thereof.

FIG. 2 illustrates a process flow 200 for the monitoring and automatic maintenance of service IDs, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIGS. 1A-1C) may perform the steps of process flow 200.

As shown in block 202, the process flow 200 may include the step of identifying a service ID associated with an application within a network of an entity, wherein the service ID is required for the application to access one or more network components of the network. A network component may include applications, systems, servers, APIs, mainframe applications, subsystems and the like within the network. The application may also be a network component of the network. A service ID is analogous to user IDs, where a service ID serves as an authentication credential for an application. In some embodiments, service IDs may comprise passwords as well. In other words, the application can use the service ID to essentially request another network component for access or to receive data from or transmit data to the network component. The network component that receives the request for access may essentially use the application's service ID to authenticate the application and ensure that the application is authorized to access the network component.

Service IDs may be associated with certain data, including metadata. Stored within such data may be certain entitlements, where entitlements are essentially indicators of authorization. One service ID may have more than one entitlement. For example, in the same way that one set of credentials may be used by a user to access multiple user accounts, one service ID may be used by an application to access multiple network components. That service ID may therefore be entitled to access each of those multiple network components. As another example, application A may have a service ID that is entitled to access applications B, C, and D.

Multiple network components within the network may be associated with service IDs. In some embodiments of the disclosure, the steps of the process flow 200 may occur with respect to all service IDs within the network simultaneously.

As shown in block 204, the process flow 200 may include the step of monitoring the service ID and identifying disruptions associated with the service ID, wherein a disruption prevents use of the service ID to access one or more of the network components. For a service ID to be valid and usable, the service ID, at least, should be active, should not have expired, should be entitled to access the network components the applicable application needs to access, and should be trusted (e.g., have a known owner). If the service ID fails to meet these considerations, the application may not be able to access a certain network component using the service ID. If an application is not able to access a certain network component that the application needs to access, the application, the network component and/or the network as a whole may not function in the manner they should, which could cause significant delays or problems within the network. Each of these problems or potential problems (e.g., inactive service ID or lack of entitlements, as discussed above) may constitute a disruption.

In some embodiments of the disclosure, a list of potential disruptions may be included in predefined rules available to the system. Identifying a disruption associated with the service ID may comprise identifying the disruption according to predefined rules. In some embodiments, each of the potential problems discussed above may be part of the list of potential disruptions: expiration of the service ID, inactivity of the service ID, transfer of ownership of the service ID, or lack of entitlements. The list of potential disruptions may comprise additional details as well. For example, the list may specify that a potential disruption should be identified if the service ID has expired or if the service ID is about to expire within 30 days. The list may essentially indicate to the system what the present disclosure may identify as a disruption when monitoring the service IDs.

In some embodiments of the disclosure, as discussed above, each service ID may be associated with certain data, including metadata associated with the service ID. The data may comprise information about the use of the service ID, whether and for how long the service ID has been active or inactive, any passwords associated with the service ID, details of ownership of the service ID, and any entitlements associated with the service ID, among others. The owner of a service ID may be an individual or team within the entity that manages the application associated with the service ID, for example.

In some embodiments of the disclosure, monitoring the service ID and identifying disruptions associated with the service ID may comprise analyzing the data associated with the service ID, as described further below with respect to FIG. 3. In some embodiments of the disclosure, monitoring the service ID and identifying disruptions associated with the service ID may comprise mapping the service ID to each of the one or more network components the service ID is used to access, as described further below with respect to FIG. 3.

As shown in block 206, the process flow 200 may include the step of matching an identified disruption with a corresponding update in predefined rules. The predefined rules may comprise updates for each of the potential disruptions listed in the predefined rules. In some embodiments, matching an identified disruption with a corresponding update may comprise first identifying which listed potential disruption is the equivalent of or closest to the identified disruption. Then, the update for such listed potential disruption may be identified. In some embodiments, the predefined rules may be contained within a database, where matching the identified disruption to a corresponding update comprises finding the potential disruption in the database and finding the associated update in the database. For example, the update for an inactive service ID may be to delete the service ID. In some embodiments, the predefined rules may comprise a roadmap with instructions on how to identify disruptions and updates for each identified disruption. For example, in the case of an inactive service ID, there may be different updates depending on how long the service ID has been inactive. Essentially, matching an identified disruption with a corresponding update in the predefined rules may mean using the predefined rules to determine an update relevant to the disruption, i.e., an update that would solve the problem caused by the disruption.

As shown in block 208, the process flow 200 may include the step of implementing the corresponding update for the identified disruption based on the predefined rules. In some embodiments of the disclosure, implementing the corresponding update may comprise changing the data or metadata relevant to the disruption. In some embodiments of the disclosure, the predefined rules may also comprise instructions for implementing the updates for each of the potential disruptions. For example, if a service ID is about to expire, the instructions may provide for refreshing the service ID. If the password associated with a service ID is invalid, as another example, the instructions may provide for changing the password according to the password requirements such that the password would become valid. In some embodiments, and as another example, the instructions may also provide for alerting a user of the disruption and requesting and receiving instructions from the user for implementing the update. The user may specify the update based on the specific disruption. In some embodiments, the user may implement the update directly. For example, if the user is notified that the service ID lacks a certain entitlement, the user may add the entitlement directly or provide instructions on what entitlement to add. In some embodiments, the user may be alerted if the predefined rules do not provide information capable of identifying a corresponding update to the identified disruption or if the predefined rules do not provide adequate instructions for implementing the corresponding update.

As shown in block 210, the process flow 200 may include the step of validating the corresponding update. Validating the corresponding update comprises confirming that the corresponding update causes the service ID to function within the network. In some embodiments of the disclosure, validating the corresponding update means temporarily implementing the update to test whether the update solves the problem posed by the disruption. For example, if a password of a service ID needed to be updated because it was about to expire, validating the update may comprise using the updated password until after the original password was supposed to expire to ensure the updated password works. When service IDs are monitored, the temporarily implemented updates may be monitored as well. This would allow for the identification of disruptions that may be caused by the update. For example, if an update to one disruption causes a different disruption, the temporary implementation would allow for such different disruptions to be identified.

In some embodiments, and as described further below with respect to FIG. 4, validating the corresponding update comprises monitoring the service ID after implementing the corresponding update for a period of time; verifying that there are no additional disruptions associated with the service ID during the period of time; and confirming, upon verification that there are no additional disruptions associated with the service ID, that the corresponding update causes the service ID to function within the network.

As shown in block 212, the process flow 200 may include the step of transmitting the corresponding update to instances of the service ID occurring within the network upon validating the corresponding update. A service ID may occur in multiple instances throughout the network. For example, an application may function across different environments within the network and there may be multiple instances of the service ID associated with the application across the different environments. Once the corresponding update is implemented and validated, i.e., ensuring the update works, the update can be transmitted to all instances of the service ID occurring within the network. In some embodiments, transmission of the update may be determined based on the predefined rules. In some embodiments, transmitting the update may comprise transmitting the updated metadata to the secondary environment and updating the metadata associated with the service ID accordingly in the secondary environment.

In some embodiments, the steps of process flow 200 may include the use of an artificial intelligence (AI) model, wherein the AI model may consistently monitor service IDs, identify disruptions and implement updates based on the predefined rules as well as historical data associated with disruptions and corresponding updates.

FIG. 3 illustrates a diagram 300 for monitoring the service ID and identifying disruptions associated with the service ID, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIGS. 1A-1C) may perform the steps of process flow 300.

As shown in block 302, the step 204 monitoring the service ID and identifying disruptions associated with the service ID may comprise mapping the service ID to each of the one or more network components the service ID is used to access. For example, and in some embodiments, mapping the service ID may comprise checking the entitlements of the service ID to determine which network components the service ID is entitled to access. In some embodiments, mapping the service ID may comprise checking the activity history of the service ID to determine which network components the application accessed or attempted to access using the service ID. This may further comprise determining whether the service ID is entitled to access any network component that the application never tried to access or has not recently tried to access and/or determining whether the service ID is not entitled to access a network component the application is trying to access using the service ID. In such cases, a disruption (either inactivity or lack of entitlements as the case may be in the examples in this paragraph) may be identified.

As shown in block 304, the step 204 monitoring the service ID and identifying disruptions associated with the service ID may comprise analyzing data associated with the service ID. Monitoring the data may comprise essentially reading all data and metadata associated with service ID. Analyzing the data may comprise, in some embodiments, first reading the data at any given time and storing that data. Then, when reading the data at a subsequent time, the data is compared to the stored data. If there is no change to the data, the stored data may be deleted and the data at the subsequent time may be stored in the place of the previously stored data. If there is a change in the data, a disruption may be identified. For example, if the owner of the service ID changes, that may be an identifiable disruption. Additionally, and in some embodiments, analyzing the data may comprise analyzing all data as being interconnected and may also comprise analyzing the changes according to the predefined rules. For example, if the predefined rules list that a service ID expiring within 30 days should be flagged as a disruption, analyzing the data may comprise not only looking for a change in the status of the service ID, whether or not it has expired, but also monitoring the expiry date and the current date to determine if the criteria of the predefined rules has been met.

FIG. 4 illustrates a process flow 400 for validating the corresponding update, in accordance with an embodiment of the disclosure. In some embodiments, a system (e.g., similar to one or more of the systems described herein with respect to FIGS. 1A-IC) may perform one or more of the steps of process flow 400. For example, a system (e.g., the system 130 described herein with respect to FIGS. 1A-IC) may perform the steps of process flow 400.

As shown in block 402, the process flow 400 may include the step of monitoring the service ID after implementing the corresponding update for a period of time. Monitoring the service ID, as similarly described above, may comprise essentially reading the data and metadata associated with the service ID and analyzing the data to track any changes made to the data or metadata associated with the service ID. The service ID is monitored after the corresponding update is temporarily implemented. The corresponding update is temporarily implemented for a specific period of time. The specific period of time may be provided for in the predefined rules and may vary based on the disruption and based on the update for the disruption. In some embodiments, a user may provide instructions regarding the specific period of time.

As shown in block 404, the process flow 400 may include the step of verifying that there are no additional disruptions associated with the service ID during the period of time. Essentially, the service ID is monitored to ensure that the service ID with the implemented corresponding change does not give rise to any additional disruptions. The service ID would be monitored and additional disruptions would be identified in a manner similar to the processes for monitoring the service ID and identifying disruptions associated with the service ID, as described above with respect to FIGS. 2 and 3. The service ID would be monitored and additional disruptions would be identified for the entire duration of the specified period of time. If no disruptions were identified from the time the monitoring begins through the end of the specified period of time, that would be adequate verification that there were no additional disruptions associated with the service ID. Verifying that there are no additional disruptions may comprise ensuring that the initially identified disruption is no longer an issue. Essentially, this step provides for ensuring that the temporarily implemented update works as intended, ensures the validity, continued usability and functionality of the service ID, and does not raise any further issues associated with the service ID.

As shown in block 406, the process flow 400 may include the step of confirming, upon verification that there are no additional disruptions associated with the service ID, that the corresponding update causes the service ID to function within the network. Upon verifying that there were no additional disruptions associated with the service ID with the implemented temporary update, the present disclosure provides for confirming that the corresponding update causes the service ID to function within the network, where functioning within the network may mean that the service ID works as intended and the identified disruptions are resolved. Upon confirmation that the corresponding update causes the service ID to function within the network, the corresponding update may be implemented permanently. Additionally, confirming that the corresponding update cases the service ID to function within the network may also trigger the step of transmitting the corresponding update to instances of the service ID occurring within the network, as further described above with respect to FIG. 2. The owner of the service ID may be notified that the updates were successfully implemented. The owner of the service ID may also be notified if the corresponding update is not validated through this process. Notifying the owner may comprise generating a notification that the updates were successful or not successful and, if not successful, the reason for failure. Notifying the owner may further comprise transmitting the notification to a user device of the owner. In some embodiments, the owner may, via a user interface of the user device, respond to the notification with instructions for additional updates.

FIG. 5 illustrates a process flow 500 for monitoring service IDs, identifying disruptions and implementing updates, in accordance with an embodiment of the disclosure. In some embodiments, a system (e.g., similar to one or more of the systems described herein with respect to FIGS. 1A-IC) may perform one or more of the steps of process flow 500. For example, a system (e.g., the system 130 described herein with respect to FIGS. 1A-IC) may perform the steps of process flow 500.

The process flow 500 depicts monitoring applications in real time and periodically monitoring the service IDs associated with such applications. The process flow 500 depicts actively monitoring service IDs for password validity, access, type, and the like. The process flow 500 depicts validating a service ID if the service ID is active and has the required access authorizations to be able to access the respective network components, such as APIs. The process flow 500 further depicts identifying potential issues with the service IDs and orchestrating fixes to govern such issues. Fixes for service IDs may include updating access, password rotations, deleting inactive service IDs, and the like. Upon orchestrating a fix, the process flow 500 further depicts applying temporal validation for the updated service IDs, where temporal validations essentially means temporarily implementing and testing the updated IDs. Upon validating the updated service ID, the updated service ID is cascaded to different environments. The process flow 500 also depicts notifying the owner of the service ID of the updates.

Thus, present embodiments of the disclosure discussed in detail above, the present disclosure provides for the monitoring and automatic maintenance of service IDs. The disclosure provides for identifying a service ID, monitoring the service ID, and identifying any disruptions associated with the service ID, where a disruption is any change to or quality or component of the service ID that prevents the service ID from being used by the application the service ID is associated with to access one or more of the network components. Monitoring the service ID and identifying disruptions may comprise mapping the service ID to each of the one or more network components the service ID is used to access or analyzing data associated with the service ID. The disclosure further provides for matching an identified disruption with a corresponding update in predefined rules. Predefined rules may comprise a list of potential disruptions that can be used to identify disruptions, updates for each listed potential disruption and instructions on how to implement the update for each potential disruption. Predefined rules may be received from a user or from the one or more network components of the network. Potential disruptions may comprise expiration of a service ID, inactivity of the service ID, transfer of ownership of the service ID, or lack of entitlements associated with the service ID.

The disclosure further provides for implementing the corresponding update for the identified disruption based on the predefined rules and validating the corresponding update. Validating the corresponding update may comprise confirming that the corresponding update causes the service ID to function within the network. Validating the corresponding update may further comprise monitoring the service ID after implementing the corresponding update for a period of time, verifying that there are no additional disruptions, and confirming that the corresponding update causes the service ID to function within the network. The disclosure further provides for transmitting the corresponding update to instances of the service ID occurring within the network upon validating the corresponding update. The disclosure further provides for notifying the owner of the service ID if the system fails to validate the corresponding update or upon transmitting the corresponding update to the instances of the service ID occurring in the network.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring and automatic maintenance of service identifications (IDs), the system comprising:
- at least one memory device comprising non-transitory computer-readable medium with computer-readable program code stored thereon;
- at least one processing device operatively couples to the at least one memory device and at least one communication device, wherein when executed, the computer-readable code is configured to cause the at least one processing device to:
  - identify a service ID associated with an application within a network of an entity, wherein the service ID is required for the application to access one or more network components of the network;
  - monitor the service ID and identify disruptions associated with the service ID, wherein a disruption prevents use of the service ID to access one or more of the network components;
  - match an identified disruption with a corresponding update in predefined rules;
  - implement the corresponding update for the identified disruption based on the predefined rules;
  - validate the corresponding update, wherein validating the corresponding update comprises confirming that the corresponding update causes the service ID to function within the network; and
  - transmit the corresponding update to instances of the service ID occurring within the network upon validating the corresponding update.

2. The system of claim 1, wherein monitoring the service ID and identifying the disruptions associated with the service ID comprises mapping the service ID to each of the one or more network components the service ID is used to access.

3. The system of claim 1, wherein monitoring the service ID and identifying the disruptions associated with the service ID comprises analyzing data associated with the service ID.

4. The system of claim 1, wherein validating the corresponding update comprises:
- monitoring the service ID after implementing the corresponding update for a period of time;
- verifying that there are no additional disruptions associated with the service ID during the period of time; and
- confirming, upon verification that there are no additional disruptions associated with the service ID, that the corresponding update causes the service ID to function within the network.

5. The system of claim 1, wherein the predefined rules comprise a list of potential disruptions, updates for each of the potential disruptions, and instructions for implementing the updates for each of the potential disruptions.

6. The system of claim 5, wherein the list of potential disruptions comprises at least one of: expiration of the service ID, inactivity of the service ID, transfer of ownership of the service ID, or lack of entitlements associated with the service ID.

7. The system of claim 1, wherein the computer-readable code is further configured to cause the at least one processing device to receive the predefined rules from a user or from the one or more network components of the network.

8. The system of claim 1, wherein the computer-readable code is further configured to cause the at least one processing device to notify an owner of the service ID if the system fails to validate the corresponding update or upon transmitting the corresponding update to the instances of the service ID occurring in the network.

9. A computer implemented method for monitoring and automatic maintenance of service identifications (IDs), the computer implemented method comprising:

identifying a service ID associated with an application within a network of an entity, wherein the service ID is required for the application to access one or more network components of the network;

monitoring the service ID and identify disruptions associated with the service ID, wherein a disruption prevents use of the service ID to access one or more of the network components;

matching an identified disruption with a corresponding update in predefined rules;

implementing the corresponding update for the identified disruption based on the predefined rules;

validating the corresponding update, wherein validating the corresponding update comprises confirming that the corresponding update causes the service ID to function within the network; and transmitting the corresponding update to instances of the service ID occurring within the network upon validating the corresponding update.

10. The computer implemented method of claim 9, wherein monitoring the service ID and identifying the disruptions associated with the service ID comprises mapping the service ID to each of the one or more network components the service ID is used to access.

11. The computer implemented method of claim 9, wherein monitoring the service ID and identifying the disruptions associated with the service ID comprises analyzing data associated with the service ID.

12. The computer implemented method of claim 9, wherein validating the corresponding update comprises:

monitoring the service ID after implementing the corresponding update for a period of time;

verifying that there are no additional disruptions associated with the service ID during the period of time; and confirming, upon verification that there are no additional disruptions associated with the service ID, that the corresponding update causes the service ID to function within the network.

13. The computer implemented method of claim 9, wherein the predefined rules comprise a list of potential disruptions, updates for each of the potential disruptions, and instructions for implementing the updates for each of the potential disruptions.

14. The computer implemented method of claim 13, wherein the list of potential disruptions comprises at least one of: expiration of the service ID, inactivity of the service ID, transfer of ownership of the service ID, or lack of entitlements associated with the service ID.

15. The computer implemented method of claim 9, the computer implemented method further comprising receiving the predefined rules from a user or from the one or more network components of the network.

16. The computer implemented method of claim 9, the computer implemented method further comprising notifying an owner of the service ID if the computer implemented method fails to validate the corresponding update or upon transmitting the corresponding update to the instances of the service ID occurring in the network.

17. A computer program product for monitoring and automatic maintenance of service identifications (IDs), wherein the computer program product comprises at least one non-transitory computer-readable medium having computer-readable program code portions embodied therein, the computer-readable program code portions which when executed by a processing device are configured to cause the processing device to:

identify a service ID associated with an application within a network of an entity, wherein the service ID is required for the application to access one or more network components of the network;

monitor the service ID and identify disruptions associated with the service ID, wherein a disruption prevents use of the service ID to access one or more of the network components;

match an identified disruption with a corresponding update in predefined rules;

implement the corresponding update for the identified disruption based on the predefined rules;

validate the corresponding update, wherein validating the corresponding update comprises confirming that the corresponding update causes the service ID to function within the network; and transmit the corresponding update to instances of the service ID occurring within the network upon validating the corresponding update.

18. The computer program product of claim 17, wherein monitoring the service ID and identifying the disruptions associated with the service ID comprises at least one of mapping the service ID to each of the one or more network components the service ID is used to access or analyzing data associated with the service ID.

19. The computer program product of claim 17, wherein the predefined rules comprise a list of potential disruptions, updates for each of the potential disruptions, and instructions for implementing the updates for each of the potential disruptions.

20. The computer program product of claim 17, wherein validating the corresponding update comprises:

monitoring the service ID after implementing the corresponding update for a period of time;

verifying that there are no additional disruptions associated with the service ID during the period of time; and confirming, upon verification that there are no additional disruptions associated with the service ID, that the corresponding update causes the service ID to function within the network.

* * * * *